May 22, 1923.

B. R. NYHAGEN

GAS ENGINE VALVE

Filed April 28, 1920

INVENTOR
BARNEY R. NYHAGEN
BY James A. G. Koell
ATTORNEY

May 22, 1923.
B. R. NYHAGEN
GAS ENGINE VALVE
Filed April 28, 1920
1,456,144
3 Sheets-Sheet 2
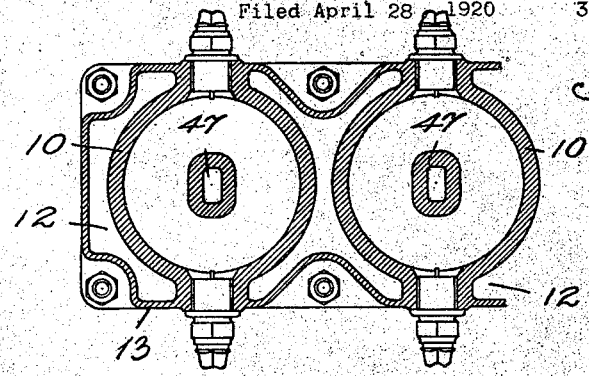
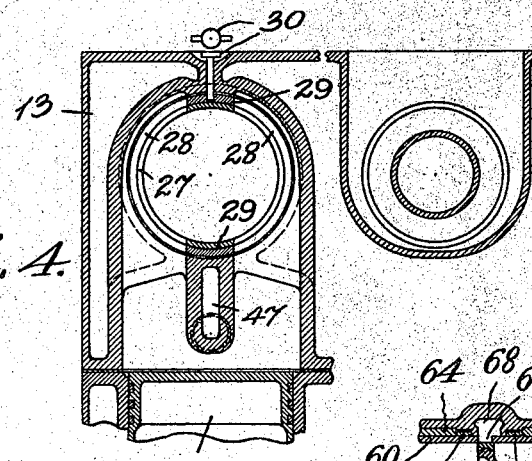
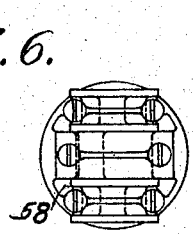
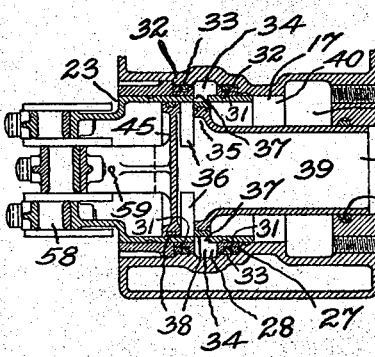
INVENTOR
BARNEY R. NYHAGEN
BY
James A. G. Koch
ATTORNEY

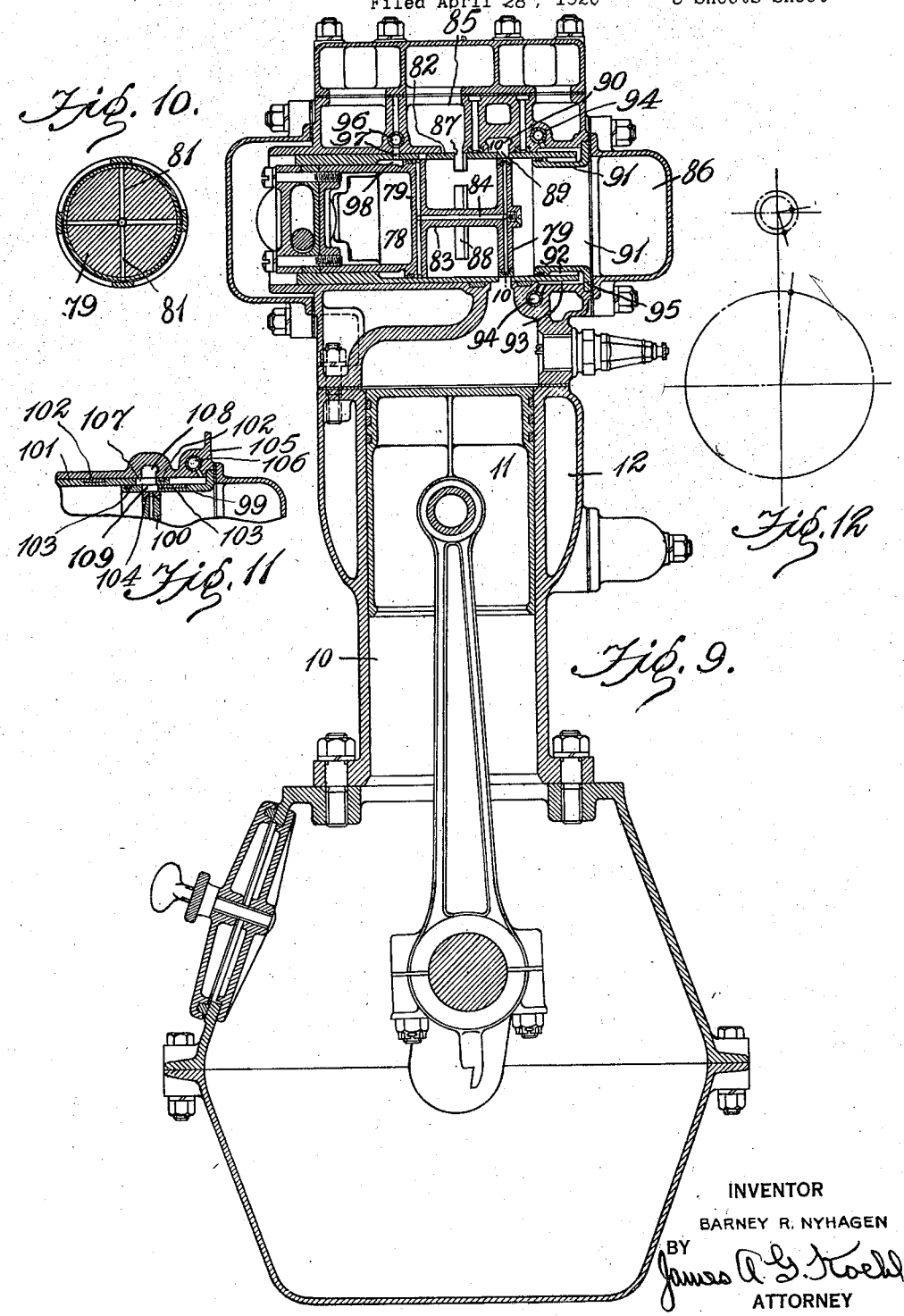

Patented May 22, 1923.

1,456,144

UNITED STATES PATENT OFFICE.

BARNEY R. NYHAGEN, OF NEW YORK, N. Y.

GAS-ENGINE VALVE.

Application filed April 28, 1920. Serial No. 377,199.

*To all whom it may concern:*

Be it known that I, BARNEY R. NYHAGEN, a citizen of the United States, and resident of New York, in the county of Bronx and State of New York, have invented certain new and useful Improvements in Gas-Engine Valves, of which the following is a specification.

This invention relates to internal combustion engines and more particularly to valve mechanism therefor and has for its primary object the provision of means for simplifying the construction of such mechanism and for rendering the same positive of action, silent while operating, self cleaning, durable, effective for the purpose of creating maximum power by providing for better combustion of the gas and preventing loss of compression, and one wherein the several parts thereof are capable of quick and convenient removal; separation from each other or connection together, as the occasion necessitates.

The valve mechanism is of the sleeve type and it has embodied in its construction, a plurality of correlated ported sleeves adapted to co-operate with the combined inlet and exhaust port in a valve head or casing, and an essential feature of construction of the invention resides in the provision of means to prevent overheating of the sleeves and for accellerating the action of the working parts so as to cause prompt expulsion of the exhaust gas and for preventing the heat from the gas from being unduly spent against the valve sleeves or from remaining in the immediate proximity thereof for any appreciable or objectionable interval after an explosion is created in the power cylinder.

Another novel feature of construction resides in the provision of correlated ported sleeves and means for establishing independent sources of communication between the sleeves and the intake and exhaust manifolds of the engine, and for subjecting the gas to a more perfect vaporizing action in the interval passing between its actual discharge from the intake manifold and its entrance to the power cylinder of the engine.

A further feature lies in the provision of a sleeve valve mechanism which can be readily installed upon many types of commercial or well known forms of power cylinders so as to quickly convert an engine of the "poppet valve type" into one of the sleeve valve variety.

With these ends in view this invention consists in the details of construction and combination of elements hereinafter set forth and thence specifically designated by the claims.

In order that those skilled in the art to which this invention appertains, may understand how to make and use the same, the construction and operation will be described in detail, referring to the accompanying drawings, forming part of this specification in which:—

Figure 2 is a section taken on line 2—2 of Figure 1.

Figure 3 is a section taken on line 3—3 of Figure 1.

Figure 4 is a section taken on line 4—4 of Figure 1.

Figure 5 is a section taken on line 5—5 of Figure 1.

Figure 6 is an end view of the crank mechanism.

Figure 8 is a section through the valves showing a slightly modified form of my invention.

Figure 9 is a view similar to Figure 1 showing a further modified form of the invention.

Figure 10 is a section on the line 10—10 of Figure 9.

Figure 11 is a section through the valves showing another modification.

Figure 12 is a diagrammatic illustration of the valve timing mechanism.

Figures 1, 7:
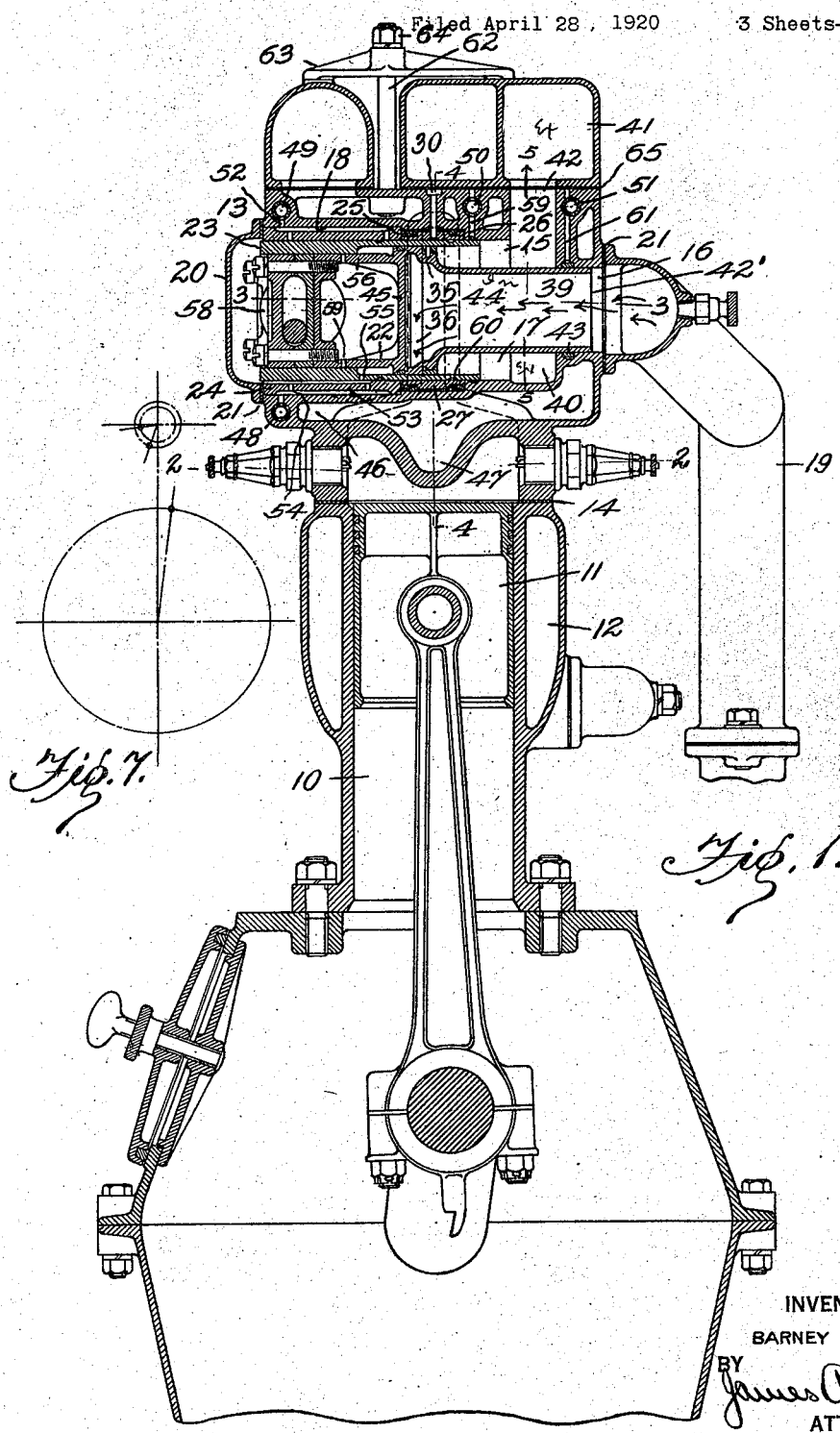
Figure 1 is a vertical section through a portion of an internal combustion engine showing the application of the invention thereto.
Figure 7 is a diagrammatic view of the timing mechanism of the valves.

In carrying the invention into practice, I have selected the arrangement which I will now proceed to describe, but I wish it to be understood that the position of the various parts of the structure can be transposed or rearranged, and while I will specifically refer to a valve head or casing mounted above a power cylinder, this is only illustrative of one practical embodiment of the invention, it being understood that the same may be mounted at the side or at the bottom thereof if desired, without departing from the spirit and purpose of the invention.

The power cylinder 10 may be of any approved or well known construction wherein is included a reciprocating piston 11. The cylinder is surrounded by a cooling chamber 12. At the upper open end of the cylinder I mount my improved valve head 13 and as illustrated the parts are separated from each other by a suitable sealing gasket 14.

The valve head is provided with a continuous bore 15 which opens at its ends onto the opposite sides of the valve head and as illustrated said bore is provided with sections 16, 17 and 18 respectively of varying diameters. An intake manifold 19 is operatively connected with the restricted section 16 of said bore 15. This closes one end of said bore and as illustrated the opposite end of the bore is closed by a removable cap 20, the latter and the discharge end of the intake manifold, each operatively provided with a sealing gasket 21.

Working in the bore 15 are reciprocating valve sleeves 22 and 23. These sleeves are telescopic and slide one within the other in time with the movements of the piston 11 in the power cylinder 10. The outer sleeve 23 is surrounded by a bushing 24, the latter seated against a shoulder 25 formed in the bore 15. A second shoulder 26 is formed in said bore 15 and embracing said outer sleeve 23 and confined between the shoulders 25 and 26 is a contractile packing ring 27, the same having ports 28—28 separated from each other by bridge walls 29. A pin 30 is removably connected with the head 13 and with the ring 27 to hold the same fixed against circumferential movement around said sleeve 23. The packing ring 27 is rabbeted at each side of its vertical center at 31 for the reception of contractile and expanding packing rings 32 and 33. This construction is such that the joints between the valve sleeves and the bore 15 are securedly closed against the loss of compression as will be appreciated as other structural features of the invention are explained. All of these co-acting rings are of the split type and they are arranged so that the joint between the ends of one ring is closed by the intermediate portion of an adjacent ring. The rings 32 and 33 are disposed at the sides of the ports 28—28.

The valve head is provided with combined inlet and exhaust ports 34—34 which are in permanent registration with the ports 28—28. The said ports 34—34 lead to the power cylinder 10 and open onto the upper surface of the piston 11.

The inner sleeve 22 is provided with an enlarged piston-like head 35 having diametrically arranged ports 36—36. The outer sleeve 23 is provided with corresponding ports 37—37 which are arranged to co-act with the ports 34—34 and 36—36 in time with the movements of the piston 11 so as to admit the explosive charges to the power cylinder and provide for a discharge of the exhaust gas therefrom. The said piston-like portion 35 of the inner sleeve valve is provided with the expanding rings 38—38 disposed at the sides of the ports 36—36 and operating against the inner walls of the outer sleeve valve 23. This construction, in combination with the construction of the ring 27 causes the outer sleeve 23 to be operatively sandwiched between such parts so as to positively prevent loss of compression and thereby assure the highest measure of efficiency of the motor.

The inner sleeve valve 22 is provided with the cylindrical reduced section 39 which is spaced from the walls of the intermediate section 17 of the bore 15 so as to define therewith an intervening transfer space 40 which leads to an exhaust manifold 41 by way of relatively large exhaust passages 42. The said section 39 has one of its ends slidable in the section 16 of said bore 15. Said end is open at 42 in line with the discharge end of the intake manifold. The section 16 of said bore 15 is provided with a contractile packing ring 43, the same bearing against the external walls of said extension 39 as clearly shown. The inner end of the passage 44 which latter is defined by the walls of the extension 39 is closed by a baffle wall 45 which constitutes a part of the inner sleeve valve and as shown it is disposed directly at one side of the ports 36—36. The construction just described is such that as the gasoline or liquid fuel leaves the intake manifold, it is conducted through the passage 44 and then brought in contact with the baffle wall 45. Inasmuch as the inner sleeve 22 is subjected to some heat from the engine it will be seen that by passing the fuel through the passage 44, better vaporization of the fuel will be had. It will also be observed that the position of the baffle wall 45 acts to cause a direct impingement of the explosive charge thereagainst, breaking up the charge and causing a uniform mixture to be consistently delivered to the power cylinder 10. This results in operating the engine on a smaller quantity of fuel than would be otherwise possible.

In order to prevent the sleeves from overheating I provided the valve head with the cooling chamber 46 and at the vertical center of the power cylinder 10, said cooling chamber has its greatest depth as illustrated at 47. This allows for the circulation of a maximum quantity of water around the portions of the sleeves which would be ordinarily subjected to the intense heat from the engine.

To further insure against overheating of the valve sleeves, I provide an oiling system which has embodied in its construction a force feed pipe 48 arranged in the head and provided with branches 49, 50 and 51, the former communicating with passage ways 52 in the valve head. The bushing 24 is provided with oil distributing grooves 53, and as shown, said bushing is perforated at 54 so as to permit the oil, as it leaves the grooves 53 to pass onto the outer sleeve valve 23. Said outer sleeve valve is provided with perforations 55 which open onto the yoke 56 of the inner sleeve valve. Said yoke 56 of the inner sleeve valve, and the yoke 57 of the outer sleeve valve are operatively connected with a crank mechanism 58. The yoke 56 is also provided with perforations 59 adapted to communicate with the oil distributing grooves 53 by way of the perforations 55 in the outer sleeve valve. This construction causes the lubricating oil to be drawn through all of the working parts of the valve mechanism and it also permits the oil to be sprayed against the valve operating crank, the several features resulting in added efficiency, durability, reliability etc. with minimum operating costs. The crank mechanism 58 is located directly at the inside of the cap 20 so that when the latter is removed, free access can be had to the former. The bore 15, by opening directly onto the opposite sides of the valve head causes the valve sleeves to be exposed from either end of the head when the intake manifold 19 and the cap 20 are removed. The valve sleeves can be extracted from the bore 15 with the utmost freedom. When this is done the several packing rings hereinbefore referred to will be likewise exposed, permitting repairs to be made thereto as the occasion requires. The branch 50 of the pipe 48 opens onto the forward end of the outer sleeve valve as shown at 59 and it is preferred that the forward end of said outside sleeve be provided with annular oil grooves 60 so that free lubrication of the ring 27 will be had. The branch 51 is exposed to the packing ring 43 by way of a passage 61.

The exhaust manifold 41 is secured against the upper end of the valve head by means of a stay bolt 62 with which a bracket 63 is associated and adapted to co-act with the clamping nut 64 on said bolt so that the exhaust manifold will be moved in sealing contact with the gasket 65.

In Figure 1, the valve sleeves 22 and 23 are in the positions they assume at the beginning of the suction stroke, the ports 36—36 about to register with the ports 37—37, and in turn with the combined inlet and exhaust ports 34—34 of the valve head. When all of said ports are properly registered, the explosive mixture is sucked into the combustion chamber of the power cylinder 10. The valve sleeves are then moved out of registry with said power cylinder, thereby cutting off the further admission of the mixture. During the exhaust stroke of the piston 11, the relative positions of the mentioned ports 34—34 and 37—37 change so as to permit the exhaust gas to pass into the transfer space 40 at the right hand side of the piston 35. Upon the next movement of the valves to admit a charge to the cylinder 10, the exhaust gas is rapidly expelled from the transfer space and conducted to the exhaust manifold. This arrangement, in connection with the manner of cooling the valves by the water jacket which surrounds the same, maintains the valves at a proper working temperature and prevents their overheating.

In certain respects, the valve mechanism herein disclosed is operated and timed precisely in accordance with the showing and description contained in my co-pending application, original filed August 25, 1917, Sr. No. 188,258, renewal No. 279,889, filed February 28, 1919, allowed December 5, 1919, and for this reason a further description of the various positions of the present valve sleeves is believed unnecessary.

In Figure 8, I provide inner and outer sleeve valves 60 and 61, the former ported at 62 and adapted to be respectively uncovered and covered by the head 63 of the valve 61. The valve 60 works in fixed bushings 64 and 65 arranged in the bore 66 of the valve head 67. Said head 67 has a portway 68 which leads to the cylinder. At the sides of this last named portway are packing rings 69—69 which contract against the valve 60. A bushing 70 in the bore of the valve head has a hollow reduced section 71 through which the reduced section 72 of the valve 63 slides, a packing ring 73 being disposed between said parts 71 and 72. Said section 71 has a cooling space 74 therein which opens at 75 into a similar space 76 around the inner end of the intake manifold 77.

In Figures 9 and 10, the inner sleeve valve 78 is provided with spaced heads 79—79 which have radial oil grooves 81 opening onto the periphery of said heads and onto the inner walls of the outer valve 82. The head 79—79 are connected together by a stem 83 having a bore 84 which connects the oil grooves of one head with those of the other head, as shown. The intake and exhaust manifolds 85 and 86 are slightly different from those described in the first embodiment of the invention and as illustrated the manifold 85 ported at 87 to co-act with the ports 88 in the valve 78. The outer sleeve valve is ported at 89 to co-act with the exhaust portway 90 in the valve head. A bushing 91 is arranged within the outer sleeve valve 82 and the same has a lubricating groove 92 communicating with a similar groove 93 in the valve head, and leading to the latter groove, is a feed pipe 94. Said bushing 91 is flanged at 95 and secured between the end of the valve head and the inner end of the exhaust manifold 86 so that the structure and the valves can be readily removed when the manifold 86 is detached. A lubricating pipe 96 is provided for feeding oil between the respective valves and the latter are suitably grooved and perforated respectively at 97 and 98 to co-act with said pipe.

In Figure 11, the bushing 99 is sandwiched between the inner and outer valves 100 and 101, packing rings 102—102—103—103 and 104 being provided for the purpose of sealing the joints between the valves to prevent leakage. The valve head 105 has a lubricating pipe 106 adapted to distribute oil between all of the working parts of the valve structure by way of the parts 107, 108, and 109, it being understood that such parts are also employed for the purpose of admitting the charge to the power cylinder.

While I have herein fully shown and described and have pointed out in the appended claims certain novel features of construction, arrangement, and operation which characterize my invention, it will be understood by those skilled in the art that various omissions, substitutions, changes, in forms, proportions, sizes and details of the engine, of the materials used, and their operation may be made without departing from my invention.

What I claim as my invention is:

1. In internal combustion engines, a power cylinder, a piston operating therein, a valve head mounted on said cylinder and defining therewith, an explosion chamber above the piston, an intake manifold, an exhaust manifold, a plurality of telescopically connected valve sleeves, the head having a chamber in which said sleeves are adapted to reciprocate, said head having a combined inlet and exhaust port leading to the power chamber, the outer sleeve having a port adapted to register with said inlet and exhaust port, the inner valve sleeve having a port adapted to register with said first and second named ports, said outer sleeve valve serving, when in one position, to close the aforesaid port of the head, the inner sleeve valve having an ejecting piston operatively co-acting with the exhaust manifold and with the inlet and exhaust ports of the outer sleeve and valve head respectively for forcing the exhaust gas into said exhaust manifold, and mechanism for reciprocating said sleeve valves in time with the movements of the piston in said power cylinder.

2. In internal combustion engines, a power cylinder, a piston working in said cylinder, a valve head overlying the cylinder and having a combined inlet and exhaust port leading to the cylinder, a plurality of telescopically-connected-ported-sleeve-valves working in the head and co-acting with said combined inlet and exhaust port, the ports of the sleeves co-acting with each other in time with the movements of the piston, means for actuating said sleeves, the inner sleeve having a baffle wall contiguous with the port of said sleeve for impingement of the vaporized gas thereagainst, and a tubular extension on the inner sleeve, the same opening to the intake manifold and against the baffle and separating the intake manifold from the exhaust manifold, said tubular extension spaced from the inner walls of the valve head to define therewith an exhaust transfer space between the combined inlet and exhaust port and the exhaust manifold.

3. In internal combustion engines, a power cylinder, a valve head overlying the cylinder and having a combined inlet and exhaust port leading to the cylinder, a plurality of telescopically-connected-ported-sleeve-valves working in the head and co-acting with said combined inlet and exhaust port, the ports of the sleeves coacting with each other in time with the movements of the piston, means for actuating said sleeves, the inner sleeve having a baffle wall contiguous with the port of the sleeve for impingement of the vaporized gas thereagainst, a tubular extension on the inner sleeve, the same opening to the intake manifold and against the baffle and adapted to separate the intake manifold from the exhaust manifold, said tubular extension and the inner walls of the valve head mutually defining an exhaust transfer space between the combined inlet and exhaust port and the exhaust manifold, and a packing ring between the extension and the valve head.

4. A valve head having a combined inlet and exhaust port, a plurality of reciprocating ported sleeve valves working in said head in operative conjunction with the aforesaid combined inlet and exhaust port, intake and exhaust manifolds operatively connected with said valves and with the combined inlet and exhaust port, means for moving the valves in time with the movements of the piston of a power cylinder, and a cooling chamber constituting part of the head and surrounding the valves, the chamber having an increasing depth at the base of the head in line with the vertical axis of the head and in proximity with its point of attachment to a power cylinder.

5. A valve head having a bore opening onto the ends of the head, telescopically connected valve sleeves reciprocating in said bore, a restricted extension on one sleeve, an intake manifold connected with one end of the bore and leading to said restricted extension, the extension spaced from the walls of the bore, an exhaust manifold connected with said space, the head having a combined inlet and exhaust port, the valves having ports respectively co-acting with each other and with the aforesaid inlet and exhaust port, means for moving the sleeves in time with the movements of the piston of a power cylinder, all of said ports being operatively related with the intake and exhaust manifolds, a cap detachable from the head and closing the opposite end of said bore, the outer sleeve having sections of varying internal diameters, and a piston on the inner sleeve slidable against the inner walls of the sections of the outer sleeve of maximum internal diameter.

6. A valve head having a bore opening onto the ends thereof, telescopically connected valve sleeves reciprocating in said bore, a restricted extension on one sleeve, an intake manifold connected at one end of the bore and leading to said restricted extension, the extension spaced from the walls of the bore, an exhaust manifold connected with said space, the head having a combined inlet and exhaust port, the valves having ports respectively co-acting with each other and with the aforesaid inlet and exhaust ports, means for moving the sleeves in time with the movements of the piston of a power cylinder, all of said ports being operatively related with the intake and exhaust manifolds, a cap detachable from the head and closing the opposite end of said bore, a packing ring interposed between the walls of the bore and the outside walls of the outer sleeve, and a bushing embracing the outer sleeve and confined between said packing ring and the detachable cap.

Signed at New York, in the county of New York, and State of New York, this 26th day of January, A. D. 1920.

BARNEY R. NYHAGEN.